United States Patent [19]

Grisar et al.

[11] 4,037,963

[45] July 26, 1977

[54] SPARK-DISCHARGE APPARATUS WITH GROUND DETECTION SAFETY CIRCUIT

[75] Inventors: Ulrich Grisar; Wilhelm Berstermann, both of Georgsmarienhuette, Germany

[73] Assignee: Klockner-Werke AG, Duisburg, Germany

[21] Appl. No.: 665,772

[22] Filed: Mar. 10, 1976

[30] Foreign Application Priority Data

Mar. 26, 1975 Germany .............................. 2513379

[51] Int. Cl.$^2$ ............................................. G03B 27/04
[52] U.S. Cl. ............................................. 356/86; 328/7
[58] Field of Search ............................. 356/86; 328/7

[56] References Cited

U.S. PATENT DOCUMENTS

| | | | |
|---|---|---|---|
| 3,791,743 | 2/1974 | Cody et al. ............................ | 356/86 |
| 3,942,892 | 3/1976 | Ambrose et al. ...................... | 356/86 |

*Primary Examiner*—Vincent P. McGraw
*Attorney, Agent, or Firm*—Michael J. Striker

[57] ABSTRACT

A spark discharge test apparatus has a holder electrode conductively engageable with a workpiece, a counter electrode adapted to be spaced by a gap from the workpiece while it is in contact with the holder electrode, a power supply including a closable switch and connected across the electrode for passing a unipolar electrical pulse across the gap only when the switch is closed, and a circuit including a terminal connectable to the workpiece and connected so as to close the switch allowing operation of the power supply only on detection of a closed circuit between the terminal and the holder electrode. Thus, a unipolar electrical pulse can only be fired between the counter electrode and the workpiece when the workpiece is in good electrical contact with the holder electrode. This safety circuit comprises a low-voltage relay having one side connected to a low-voltage power supply and another side connected to the terminal. The other side of the low-voltage power supply and the holder electrode are connected to ground.

10 Claims, 1 Drawing Figure

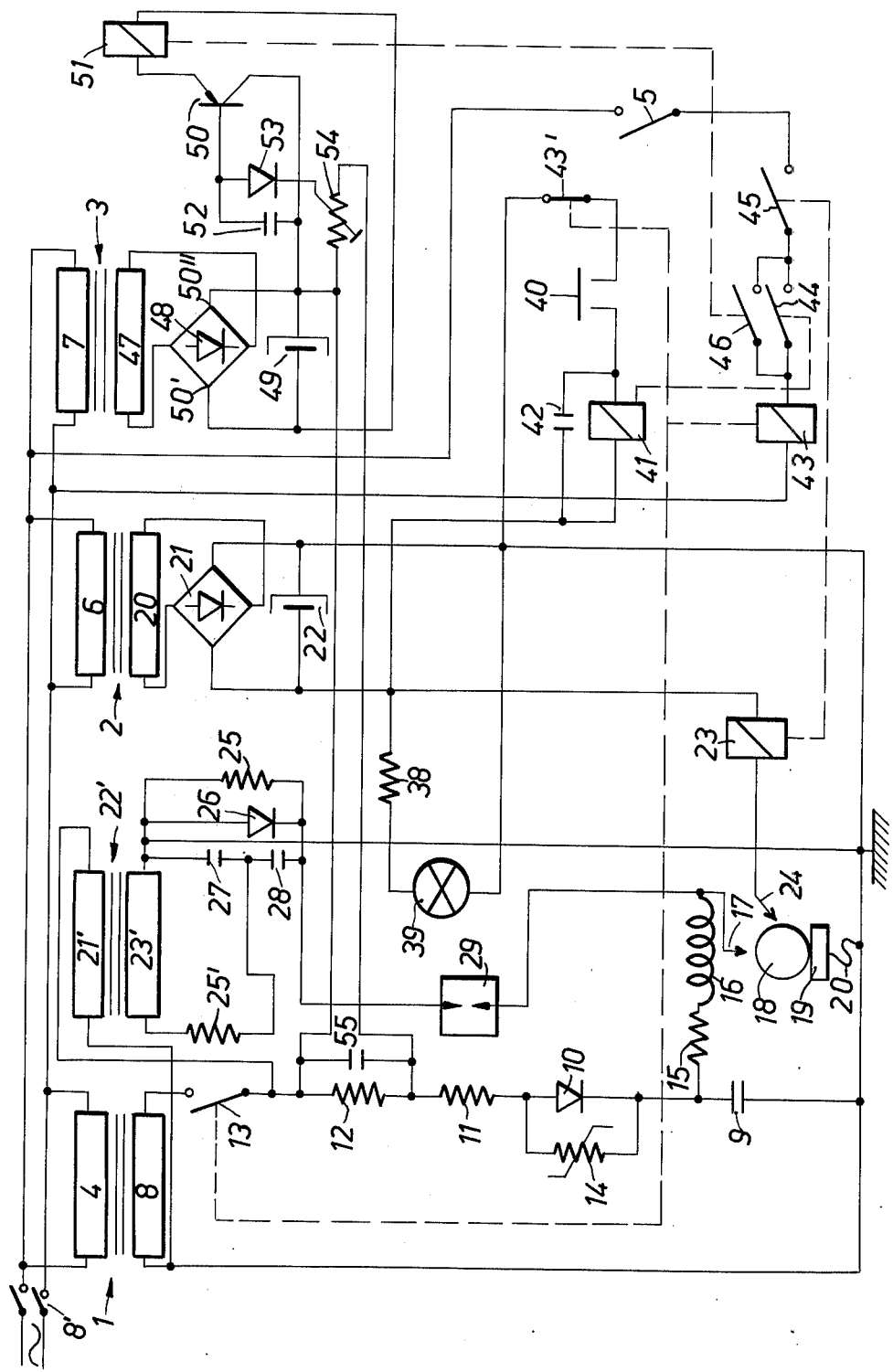

SPARK-DISCHARGE APPARATUS WITH GROUND DETECTION SAFETY CIRCUIT

CROSS-REFERENCE TO RELATED APPLICATIONS

This application is related to our copending, commonly assigned and jointly filed applications, Ser. Nos. 665,770; 665,771; 665,773 and 665,774.

BACKGROUND OF THE INVENTION

This invention concerns a spark-discharge apparatus. More particularly, this invention concerns an apparatus for passing a spark discharge between a conductive workpiece to be tested and an electrode.

It is known to test the composition of an alloy workpiece by passing a unipolar or single-polarity pulse between a sample of this workpiece which is in contact with an electrode and a counter electrode spaced from the sample. The spark produces light in both the visible and ultraviolet spectrum which can be divided into spectral lines each of which represents a component of the workpiece and the intensity of each line representing the quantity of that component in the workpiece. Thus a spectrometer working with such a spark-discharge arrangement can perform an exact quantitative and qualitative analysis of an alloy workpiece.

The production of such a spark requires very high voltage, so that the sample must normally be placed in a housing provided with safety-interlocks that prevent the device from functioning unless the housing is closed and, therefore, all operating personnel are out of danger. Furthermore, if the short wavelength of the ultraviolet part of the spectrum is of interest the test requires to be carried out in an air-free environment. Thus it is necessary to provide a large vacuum bell and associated pumping equipment. For this reason such a device is normally very large and cannot be carried to the site.

It is common practice with such arrangements to cut a small piece off all of the workpieces to be tested and carry them to the lab where the device is used. Not only does such a testing method take considerable manpower, but it usually does substantially more damage to the workpieces than is necessary for the test, as only a very small quantity of the workpiece need be vaporized by a spark to obtain the necessary information. For this reason the above-described testing method is employed as little as possible.

Some of these problems are overcome by not evacuating the apparatus, as the very short waves produced by, for example, carbon and sulfur, frequently are not of interest. For identification purposes, it is the longer ultraviolet rays produced by silicon, chromium, manganese, molybdenum, and the like that are of interest.

Another arrangement has been developed which generates a very hot spark by using a bi-polar discharge across the gap. This allows the workpiece to be analyzed in situ, however, the danger of shock to the operating personnel remains great. Furthermore, the use of a bi-polar pulse causes the counter electrode as well as the workpiece to vaporize. Some of the workpiece inevitably settles on the counter electrode so that when the next test is made it is necessary either to provide a new electrode, refinish the electrode, or make several tests to burn off the material from the earlier test. Absent these precautions each test will be somewhat contaminated by the previous tests.

SUMMARY OF THE INVENTION

It is therefore an object of the present invention to provide an improved system for spark discharge, applicable as a spark generator for a non-stationary and portable spectral analysor which is object of a further application.

Another object is the provision of an improved apparatus for passing a spark dischage between a counter electrode and a workpiece sitting on a holder electrode with safety-circuit which allow sparking only with the operator on the same potential as the workpiece.

These objects are attained according to the present invention in a spark discharge apparatus for testing the composition of a conductive workpiece which comprises a holder electrode adapted to conductively engage the workpiece, a counter electrode adapted to be spaced by a gap from the workpiece while this workpiece is in contact with the holder electrode, sparking means including a closable switch and connected across said electrodes for passing a unipolar electrical pulse across said gap only when the switch is closed, and circuit means including a terminal connectable to the workpiece and an electrical connection to the holder electrode. This circuit means is also connected to the switch and closes this switch only on detection of a closed circuit between the terminal and the holder electrode. Thus the sparking means can only operate when the terminal is in electrical contact with the workpiece and the workpiece is in electrical contact with the holder electrode. The term electrical contact is here used to mean a very low resistance path so that the terminal must be in good physical contact with the workpiece and the workpiece must also be in good physical contact with the holder electrode for the circuit to be closed.

According to other features of this invention the spark means includes a high-voltage power supply having one side connected to the holder or contact electrode and another side connected to the switch. The switch is connected to the counter electrode so as to connect this high-voltage power supply across the gap only when the switch is closed. The circuit means includes a low-voltage power supply having a loop, by which is meant a closable electrical path, including the above-mentioned terminal, a coil operatively connected to the switch to close same when the loop is closed, and the holder electrode. Thus a low test voltage is passed between the terminal and the holder electrode to energize the coil and close the switch.

According to yet another feature of this invention the circuit includes a second loop independent of the first loop and including a second power supply, a normally open second switch directly operated by the first-mentioned coil, and a second coil in series with the second switch across the second power supply. Thus the first-mentioned switch is directly operated by the second coil so that passage of a current through the first coil closes the second switch and permits the second coil to be energized by the second power supply and close the first switch.

In accordance with yet another feature of this invention the circuit includes a third loop independent of the first and second loops and including a power supply. In series with this third power supply there is provided a normally-closed switch directly operated by the second coil, a starting switch, and a third coil. The second loop further has a third normally-opened switch in series with the second coil and the second switch and directly operated by the third coil. Thus closing of the starting switch can energize the third coil to close the third switch and allow energization of the second coil which can eventually lead to closing of the first switch.

According to a further feature of the present invention the apparatus comprises a normally open fourth switch connected in parallel across the third switch and means for detecting current flow through said first loop and for maintaining said forth switch closed so long as such flow is detected. Thus if the starting switch is opened and the third switch is allowed to open, the fourth switch in parallel to it will insure continued energization of the second coil until a unipolar pulse of the desired duration is passed across the gap. This detector means may comprise a voltage drop resistor in the first loop and a transistor operating a relay whose contacts constitute the fourth switch.

According to yet another feature of this invention the first loop includes a diode and a variable resistor across the diode as well as an induction coil in series with the gap. The workpiece is adapted to rest on the holder electrode which is therefore constituted as a base.

The third loop also in accordance with the invention includes a condenser connected across the third coil for maintaining this coil energized for a predetermined period even after the starting switch or the normally closed switch operated by the second coil has opened.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a schematic view of the control apparatus in accordance with the present invention.

DESCRIPTION OF THE PREFERRED EMBODIMENTS

Three transformers 1, 2, and 3 have their primary windings 4, 6, and 7 connected in parallel to line via a double-pole single-throw on-off switch 8'. The high-voltage secondary 8 of the transformer 1 is connected to a first loop in which is provided a condenser 9, a diode 10, a pair of series-connected resistors 11 and 12, and a normally open switch 13. Connected in parallel across the diode 10 is a varistor 14.

Connected in parallel across the condenser 9 is, in series, a resistor 15, an induction coil 16, an electrode 17, a workpiece 18, another electrode 19, and a grounding cable 20. The electrode 17 is spaced by a gap from the workpiece 18 which itself lies in good electrical contact on the base or contact electrode 19. The coil 16 may be wound using resistance wire in order to eliminate the resistor 15. It should be clear that, so long as switch 13 is closed, a unipolar pulse will be fired across the gap between the electrode 17 and the workpiece 18.

Another transformer 22' is connected across the secondary 8 of the transformer 1 so that its primary 21' is only energized when the switch 13 is closed. The secondary 23' of this transfomer 22' is connected to a voltage-doubling circuit comprising, in parallel, a resistor 25, a diode 26, and a pair of series-connected capacitors 27 and 28 between which is connected a resistor 25' connected to one side of the secondary 23'. The other side of the secondary 23' is grounded. The high-voltage output from this circuit 25–28 is fed to an auxiliary spark gap 29 connected to the electrode 17. Thus closing of the switch 13 will cause a high-voltage unipolar pulse to pass between the electrode 17 and the workpiece 18, assuming that the workpiece 18 is in good electrical contact with the base 19.

The secondary 20 of the transformer 2 is connected to a full-wave rectifier bridge 21 across which is connected a smoothing capacitor 22. One side of this full-wave rectifier 21 is connected to one side of a relay coil 23 whose other side is connected to a test terminal 24 engageable with the workpiece 18. The other side of the full-wave rectifier is connected to ground. In addition there is connected across this low-voltage power supply a mercury-vapor lamp 39 in series with a resistor 38 for preionizing the auxiliary gap 29. The terminal 24 must be in good electrical conact with the workpiece 18 which in turn must be in good electrical contact with the electrode 19 in order for this low-voltage loop to be closed and for current to pass through the coil 23.

Also connected across the full-wave rectifier 21 of the low-voltage power source is a third loop constituting a momentary-contact push-button switch 40 connected in series between a normally closed switch 43' and a relay coil 41. A condenser 42 is connected across this coil 41 and serves to maintain electrical energization of this coil 41 for a limited period of time after either of the switches 40 and 43' is opened.

Connected across the line is also a relay coil 43 in series with two normally-open switches 44 and 45. The switch 44 is operated by the relay coil 41 and the switch 45 by the relay coil 23. At the same time the coil 43 operates the normally closed switch 43' and the normally open switch 13. Another normally open switch 46 is also connected across the switch 44. A time-controlled switch 5 which is connected to a control circuit is also connected in series with the coil 43 so that this coil 43 can only be electrically energized when the switches 5 and 45 are closed as well as one of the switches 44 and 46.

The transformer 3 has a secondary winding 47 connected to a bridge circuit 48 having a pair of outputs 50' and 50" across which is connected a smoothing factor 49. A transistor 50 has its collector connected to the terminal 50" and its emitter connected through a load constituted by a relay coil 51 to the terminal 50'. The base of this transistor 50 is connected via a capacitor 52 to the terminal 50" and through a diode 53 to the wiper of a potentiometer 54 connected across the resistor 12 of the first loop. A capacitor 55 is also connected across the resistor 12 to smooth out the voltage changes thereacross. When voltage flows through the resistor 12 it is detected by the transistor 50 which actuates the coil 51 that operates and closes the switch 46.

The device described above functions as follows:

With the switch 8' closed and none of the other manually operable switches operated the only coil that can be electrically energized is the relay coil 23. This can only occur when the terminal 24 is in good electrical contact with the workpiece 18 and this workpiece 18 is in turn in good electrical contact with the base electrode 19. Assuming such good contact between the terminal 24 and the workpiece 18 and between the workpiece 18 and the electrode 19 current will flow through the coil 23 to close normally open switch 45 only.

In order to fire a pulse across the gap between the electrode 17 and the workpiece 18 the switch 40 is operated. The switch 40 is connected to the timer that operates the switch 5 so that switches 40 and 5 are closed simultaneously, with switch 40 opening again as soon as it is released by the finger of the operator but switch 5 only opening after a predetermined length of time. Momentary closing of the switch 40 with the relay contact 43' closed energizes the coil 41 and charges the capacitor 42. Energization of this coil 41 will close the contacts 44 in series with the contacts 45 and, since switch 5 remains closed for a predetermined amount of time after closing of the switch 40, this will allow energization of the coil 43 to open contacts 43' and close contacts 13.

As soon as contacts 13 are closed the first loop and the primary 21' of the transformer 22' are energized and a high-voltage pulse is fired across the gap between the electrode 17 and the workpiece 18. The light emitted by this spark can be spectographically analyzed as described in our above-cited copending patent application.

Even though energization of the coil 43 will open the contacts 43', it will not cause immediate open-circuiting of the coil 43 by opening the switch 44. First of all the condenser 42 across the coil 41 will discharge when the swich 43' or the switch 40 is open so that the relay coil 41' will remain closed for a short period of time after it is open-circuited. In addition the energization of the coil 43' fires a spark across the gap 17 and 18 and causes a voltage drop across the resistor 12. This voltage drop is detected by the transistor 50 which then energizes the relay coil 51 and closes the switch 46 in parallel to the switch 44. The circuit is adjusted such that the switch 46 will close shortly before the switch 44 opens to maintain the relay coil 43 energized continuously. The pulsing then continues until the switch 5 is automatically opened, to deenergize the coil 43 which in turn will open the switch contacts 13 and shut down the whole system, except for the safety loop including the coil 23.

The normally closed contacts 43' are provided in order to insure that the pulsing will follow a predetermined program once the switch 40 is actuated. Actuating of the switch 40 after the start of a pulse and before the end thereof will have no effect as the contacts 43' will be open.

With the system according to the present invention it is impossible to fire the unipolar pulse between the electrode 17 and the workpiece 18 unless this workpiece 18 is in good electrical contact with the base electrode 19. Thus shock hazard for the operator of the machine is almost completely eliminated, and it is possible to make the machine portable without a loss in safety. Furthermore, the heavy-duty relay 43 which must operate the heavy-current switch 13 may operate off line voltage directly, whereas the light-duty switching relay 41 can operate off a much lower voltage and, therefore, allow the mounting of the switch 40 at a remote location from the device. The apparatus according to this invention is, therefore, almost fool-proof and very safe.

It will be understood that each of the elements described above, or two or more together, may also find a useful application in other types of power supply differing from the types described above.

While the invention has been illutrated and described as embodied in a spark-discharge apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A spark discharge apparatus for testing the composition of a conductive workpiece, said apparatus comprising a holder electrode conductively engageable with said workpiece; a counter electrode adapted to be spaced by a gap from said workpiece while same is in contact with said holder electrode; sparking means including a closable switch and connected across said electrodes for passing a unipolar electrical pulse across said gap only when said switch is closed; and circuit means including a terminal connectable to said workpiece and an electrical connection to said holder electrode, said circuit means being connected to said switch for closing same only on detection of a closed circuit between said terminal and said holder electrode, whereby said sparking means can only pass said pulse when said terminal is in electrical contact with said workpiece and said workpiece is in electrical contact with said holder electrode and by this the operator and the workpiece are on the same potential.

2. The apparatus defined in claim 1 wherein said sparking means includes a high-voltage power supply having one side connected to said holder electrode and another side connected to said switch, the switch being connected to said counter electrode to connect said high-voltge power supply across said gap when said switch is closed, said circuit means including a low-voltage power supply having a loop including said terminal, a coil operatively connected to said switch to close same on closing of said loop, and said holder electrode.

3. The apparatus defined in claim 2 wherein said circuit means includes a second loop independent of the first-mentioned loop and including a second power supply, a second normally open switch directly operated by the first-mentioned coil, and a second coil in series with said second switch across said second power supply, said first switch being directly operated by said second coil, whereby passage of current through said first coil closes said second switch and permits said second coil to be energized by said second power supply and close said first switch.

4. The apparatus defined in claim 3 wherein said circuit means includes a third loop independent of said first and second loops and including a power supply and in series a third normally closed switch directly operated by said second coil, a starting switch, and a third coil, said second loop further having a third normally open switch in series with said second coil and said second switch, said third switch being directly operated by said third coil, whereby closing of said starting switch can energize said third coil and close said third switch to allow energization of said second coil.

5. The apparatus defined in claim 4 wherein said second loop further has in series with said second coil a normally open timing switch.

6. The apparatus defined in claim 4 wherein said third loop includes a condenser connected across said third coil for maintaining same energized for a predetermined period even after said starting switch or said normally closed switch has opened.

7. The apparatus defined in claim 4, further comprising a normally open fourth switch connected in parallel across said third switch and means for detecting current flow through said first loop and for maintaining said fourth switch closed so long as such flow is detected.

8. The apparatus defined in claim 4 wherein said first loop includes a diode and a variable resistor across said diode.

9. The apparatus defined in claim 4 wherein said first loop includes an induction coil in series with said gap.

10. The apparatus defined in claim 1 wherein said holder electrode is a base adapted to support said workpiece.

* * * * *